(12) United States Patent
Kelnhofer

(10) Patent No.: US 10,071,807 B2
(45) Date of Patent: Sep. 11, 2018

(54) METHOD AND DEVICE FOR CONTROLLING AN AIRCRAFT AIR CONDITIONING SYSTEM

(71) Applicant: AIRBUS OPERATIONS GMBH, Hamburg (DE)

(72) Inventor: Juergen Kelnhofer, Hamburg (DE)

(73) Assignee: Airbus Operations GMBH, Hamburg (DE)

( * ) Notice: Subject to any disclaimer, the term of this patent is extended or adjusted under 35 U.S.C. 154(b) by 469 days.

(21) Appl. No.: 13/916,281

(22) Filed: Jun. 12, 2013

(65) Prior Publication Data

US 2013/0269374 A1  Oct. 17, 2013

Related U.S. Application Data

(63) Continuation of application No. PCT/EP2011/006315, filed on Dec. 14, 2011.
(Continued)

(30) Foreign Application Priority Data

Dec. 14, 2010  (DE) .................. 10 2010 054 448

(51) Int. Cl.
| | |
|---|---|
| G01K 13/00 | (2006.01) |
| F25B 49/00 | (2006.01) |
| F25B 9/00 | (2006.01) |
| B60H 1/32 | (2006.01) |
| F25D 9/00 | (2006.01) |
| B64D 13/08 | (2006.01) |

(Continued)

(52) U.S. Cl.
CPC ............. *B64D 13/08* (2013.01); *B64D 13/06* (2013.01); *B64D 2013/0618* (2013.01); *B64D 2013/0655* (2013.01); *F25B 9/06* (2013.01); *F25B 11/02* (2013.01); *F25B 2600/25* (2013.01); *F25B 2600/2501* (2013.01); *F25B 2700/13* (2013.01); *Y02T 50/56* (2013.01)

(58) Field of Classification Search
CPC .... F25B 9/04; F25B 9/06; F25B 9/065; F25B 11/02; F25B 2600/25; F25B 2600/2501; F25B 2700/13
USPC ... 62/87, 130, 131, 222, 239, 241, 401, 402, 62/DIG. 5
See application file for complete search history.

(56) References Cited

U.S. PATENT DOCUMENTS

| | | |
|---|---|---|
| 3,752,422 A | 8/1973 | Runnels |
| 5,511,385 A | 4/1996 | Drew |

(Continued)

FOREIGN PATENT DOCUMENTS

| | | |
|---|---|---|
| DE | 102 01 427 | 7/2003 |
| DE | 10 2008 053 320 | 5/2010 |

(Continued)

OTHER PUBLICATIONS

International Search Report dated Jul. 3, 2012.

*Primary Examiner* — Ned Landrum
*Assistant Examiner* — Daniel C Comings
(74) *Attorney, Agent, or Firm* — Dickinson Wright, PLLC

(57) ABSTRACT

A method for controlling an aircraft air conditioning system includes the steps of detecting an operating state of an air conditioning unit of the aircraft air conditioning system and controlling the temperature of a process air mass flow supplied to the air conditioning unit in dependence on the operating state of the air conditioning unit.

12 Claims, 3 Drawing Sheets

Related U.S. Application Data

(60) Provisional application No. 61/422,705, filed on Dec. 14, 2010.

(51) Int. Cl.
*B64D 13/06* (2006.01)
*F25B 9/06* (2006.01)
*F25B 11/02* (2006.01)

(56) References Cited

U.S. PATENT DOCUMENTS

| | | | | |
|---|---|---|---|---|
| 6,070,418 | A * | 6/2000 | Crabtree | B64D 13/06 62/172 |
| 6,148,622 | A * | 11/2000 | Sanger | B64D 13/06 62/402 |
| 6,381,969 | B1 * | 5/2002 | Afeiche | B64D 13/06 62/87 |
| 7,305,842 | B1 * | 12/2007 | Schiff | 62/244 |
| 2003/0177781 | A1 | 9/2003 | Haas | |
| 2005/0188716 | A1 | 9/2005 | Brutscher | |
| 2010/0101251 | A1 | 4/2010 | Kelnhofer | |
| 2011/0283713 | A1 | 11/2011 | Kelnhofer | |
| 2013/0067945 | A1 | 3/2013 | Kelnhofer | |
| 2013/0277009 | A1 * | 10/2013 | Army | B64D 13/06 165/41 |

FOREIGN PATENT DOCUMENTS

| | | |
|---|---|---|
| DE | 10 2010 013 956 | 10/2011 |
| EP | 1 527 994 | 5/2004 |
| EP | 10 2008 055 888 | 5/2010 |
| WO | 2008/031510 | 3/2008 |

* cited by examiner

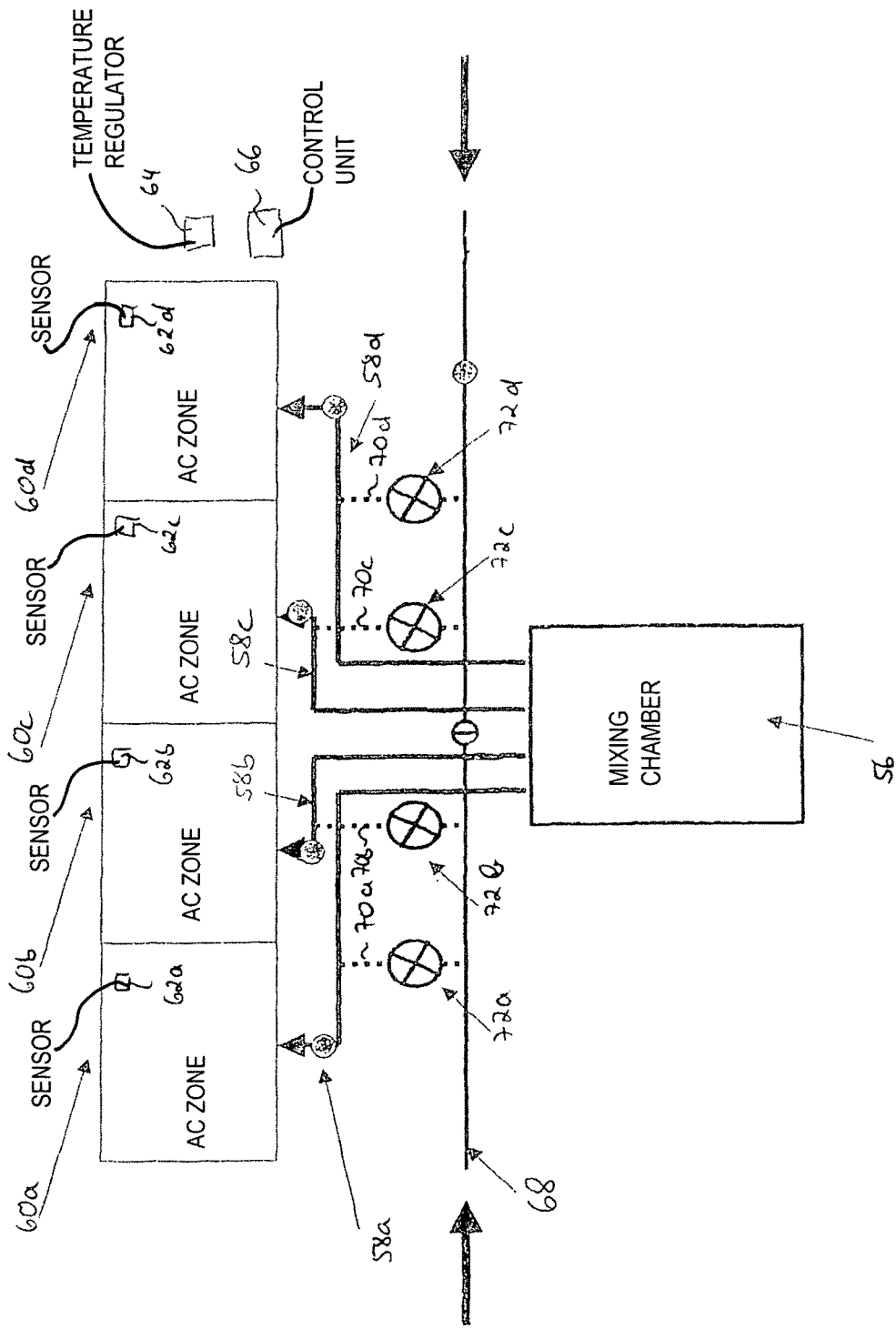

METHOD AND DEVICE FOR CONTROLLING AN AIRCRAFT AIR CONDITIONING SYSTEM

CROSS REFERENCE TO RELATED APPLICATIONS

This application is a bypass continuation of PCT/EP2011/006315 filed Dec. 14, 2011 which is entitled to and claims the benefit of German Application No. DE 10 2010 054 448.5 filed Dec. 14, 2010 and U.S. Provisional Application No. 61/422,705, filed Dec. 14, 2010, the disclosures of each of which, including the specification, claims, drawings and abstract, are incorporated herein by reference in their entirety.

FIELD

The present invention relates to a method and a device for controlling an aircraft air conditioning system.

BACKGROUND

In commercial aircraft, so-called air-supported air conditioning systems are currently conventionally used for air conditioning the aircraft cabin. An aircraft air conditioning system serves for cooling the aircraft cabin, which would otherwise become too hot due to thermal loads such as, for example, solar radiation, body heat from the passengers and waste heat from devices present on board the aircraft. Moreover, the aircraft air conditioning system supplies sufficient fresh air into the aircraft cabin to ensure that a required minimum oxygen content is present in the aircraft cabin.

Air-supported aircraft air conditioning systems generally comprise an air conditioning unit which is supplied with process air compressed by the engine of the aircraft or a separate compressor. Prior to being supplied to the air conditioning unit, the process air is pre-cooled in a preheat exchanger by heat transfer to cooling air which is likewise provided by the engines of the aircraft or a separate compressor. The cooling capacity of the preheat exchanger is controlled by controlling the cooling air mass flow through the preheat exchanger accordingly. In the air conditioning unit, the process air is cooled as it flows through a heat exchanger unit by heat transfer to ambient air flowing through a ram air channel. The ambient air mass flow through the ram air channel, and therefore the cooling capacity of the heat exchanger unit of the air conditioning unit, is controlled by opening and closing corresponding ram air channel flaps.

Cooled process air exiting from the air conditioning unit of an aircraft air conditioning system is then conducted into a mixing chamber and mixed there with recirculation air discharged from an aircraft region to be cooled, for example an aircraft cabin. The mixed air from the mixing chamber is conducted by way of corresponding mixed air lines into the aircraft region to be cooled, which is divided into different air conditioning zones. If necessary, the mixed air lines are supplied downstream of the mixing chamber with hot air, so-called trim air, which is diverted from the process air supplied to the air conditioning unit. The process air supplied to the air conditioning unit, and therefore also the trim air diverted from the process air supplied to the air conditioning unit, conventionally has a constant temperature of ca. 200° C. However, for fault scenarios or certain aircraft-environment conditions, it is also possible to provide a higher or lower process air temperature at the inlet of the air conditioning unit. The temperature of the air in the mixed air lines is therefore controlled by controlling the trim air mass flow supplied to the mixed air lines accordingly.

In general, the operation of an aircraft air conditioning system has an adverse effect on the efficiency of the aircraft in flight mode and the fuel consumption of the aircraft, with the drops in efficiency caused by the operation of the aircraft air conditioning system being greater as the amount of process air which has to be provided by the engines of the aircraft or a separate compressor increases.

Furthermore, an increase in the cooling capacity of the air conditioning unit by opening the ram air channel flaps to increase the ambient air flow through the heat exchanger unit of the air conditioning unit results in an increase in the fuel consumption of the aircraft. These correlations are described in DE 10 2008 053 320 A1.

SUMMARY

The object on which the invention is based is to provide a method and a system for controlling an aircraft air conditioning system which, in various operating situations of the aircraft air conditioning system, enable an optimisation of the efficiency and, in particular, the fuel consumption of the aircraft in flight mode.

The object is achieved by a method for controlling an aircraft air conditioning system having features of attached claims and an apparatus for controlling an aircraft air conditioning system having features of attached claims.

In the method according to the invention for controlling an aircraft air conditioning system, an operating state of the air conditioning unit of the aircraft air conditioning system is detected and the temperature of a process air mass flow supplied to the air conditioning unit is controlled in dependence on the operating state of the air conditioning unit. The method according to the invention therefore deviates from the principle followed in the prior art of supplying the air conditioning unit with process air having a substantially constant temperature and instead arranges for the temperature of the process air mass flow supplied to the air conditioning unit to be controlled in dependence on the operating state of the air conditioning unit.

By controlling the temperature of the process air mass flow supplied to the air conditioning unit, it is possible to have a direct influence on the efficiency and the fuel consumption of the aircraft in flight mode. For example, a variation of the temperature of the process air mass flow supplied to the air conditioning unit after flowing through a preheat exchanger can be effected by a corresponding variation of a cooling air mass flow through the preheat exchanger, which in turn influences the efficiency and the fuel consumption of the aircraft since the cooling air flowing through the preheat exchanger has to be provided by the engines of the aircraft or a separate compressor. Furthermore, a variation of the temperature of the process air mass flow supplied to the air conditioning unit necessarily also results in a change in the temperature of the trim air diverted from the process air mass flow supplied to the air conditioning unit. However, a change in the trim air temperature has a direct influence on the trim air requirement and therefore the quantity of process air to be provided by the engines of the aircraft or a separate compressor.

The fact that, according to the invention, the temperature control of the process air mass flow supplied to the air conditioning unit is dependent on the operating state of the air conditioning unit ensures that the efficiency advantages which may be achieved by a variation of the temperature of the process air mass flow supplied to the air conditioning unit are not compensated or even overcompensated by drops in efficiency which are linked to the operating state of the air conditioning unit. The control method according to the invention therefore readily and reliably enables the efficiency and the fuel consumption of an aircraft to be optimised by integrating the temperature of the process air mass flow supplied to the air conditioning unit as a control variable in the control of the aircraft air conditioning system.

In the method according to the invention for controlling an aircraft air conditioning system, it is possible upon detecting the operating state of the air conditioning unit to determine the operating state of at least one ram air channel flap which controls a flow cross-section of a ram air channel for the supply of ambient air to a heat exchanger unit of the air conditioning unit. The operating state of all ram air channel flaps of a ram air channel is preferably determined for the supply of ambient air to a heat exchanger unit of the air conditioning unit. The operating state of a ram air channel flap controlling a flow cross-section of a ram air channel for the supply of ambient air to a heat exchanger unit of the air conditioning unit, i.e. the opening state of the ram air channel flap, has significant effects on the air resistance and therefore the fuel consumption of the aircraft. By taking these parameters into account upon detecting the operating state of the air conditioning unit and therefore when controlling the temperature of the process air mass flow supplied to the air conditioning unit, it is thus possible to ensure that efficiency advantages which may be achieved by a variation of the temperature of the process air mass flow supplied to the air conditioning unit are not compensated or even overcompensated by drops in efficiency linked to the operating state of the ram air channel flap, which is associated with the varied temperature of the process air mass flow supplied to the air conditioning unit.

Furthermore, it is possible upon detecting the operating state of the air conditioning unit to determine the operating state of at least one internal valve of the air conditioning unit which, in its open state, effects an increase in the temperature of a process air mass flow exiting the air conditioning unit. The internal valve can be, for example, a bypass valve which is arranged in a bypass line bypassing a compressor/turbine unit of the air conditioning unit. In its open state, a bypass valve of this type ensures that warmer air flowing through a process air line of the air conditioning unit upstream of the compressor/turbine unit is added to a region of the process air line downstream of the compressor/turbine unit.

A maximum cooling capacity of the air conditioning unit of an aircraft air conditioning system, i.e. a minimum process air temperature at the outlet of the air conditioning unit, is achieved when the ram air channel flaps of the ram air channel are maximally opened for the supply of ambient air to a heat exchanger unit of the air conditioning unit and internal valves of the air conditioning unit which, in an open state, effect an increase in the process air temperature at the outlet of the air conditioning unit are closed. On the other hand, a nominal cooling capacity of the air conditioning unit is defined as a cooling capacity which the air conditioning unit delivers when the ram air channel flaps are minimally opened and the internal valves of the air conditioning unit which, in an open state, effect an increase in the process air temperature at the outlet of the air conditioning unit are closed. Since air conditioning units provided for use in aircraft air conditioning systems are conventionally designed for fault scenarios, their nominal cooling capacity generally exceeds the cooling capacity requirement which prevails in normal operation of the aircraft. It is therefore frequently necessary during operation of an air conditioning unit, even when the ram air channel flaps are only minimally opened, to open the internal valves of the air conditioning unit, which, in an open state, effect an increase in the process air temperature at the outlet of the air conditioning unit, in order to ensure that the process air exits the air conditioning unit at the desired temperature and not at too low a temperature.

Therefore, in the method according to the invention for controlling an aircraft air conditioning system, the temperature of the process air mass flow supplied to the air conditioning unit is preferably only altered when it is determined upon detecting the operating state of the air conditioning unit that the ram air channel flap only frees a minimum flow cross-section of the ram air channel for the supply of ambient air to a heat exchanger unit of the air conditioning unit and/or that the internal valve which, in its open state, effects an increase in the temperature of a process air mass flow exiting the air conditioning unit is open. In other words, the control method according to the invention preferably only takes into account a variation of the temperature of the process air mass flow supplied to the air conditioning unit when the air conditioning unit is in an operating state in which the air conditioning unit has to generate its nominal cooling capacity and not a cooling capacity which exceeds the nominal cooling capacity, i.e. the air conditioning unit designed for fault scenarios is operated in an operating state in which the ram air channel flap is only minimally opened, but it is still necessary to discharge excess cooling capacity generated by the air conditioning unit by way of the open internal valve. In this configuration of the control method according to the invention, the cooling capacity reserves of the air conditioning unit which are held ready for fault scenarios are used optimally for increasing efficiency through a variation in the temperature of the process air mass flow supplied to the air conditioning unit.

In the method according to the invention, the temperature of the process air mass flow supplied to the air conditioning unit is preferably increased when it is determined upon detecting the operating state of the air conditioning unit that the ram air channel flap only frees a minimum flow cross-section of the ram air channel and/or that the internal valve is open. An increase in the temperature of the process air mass flow supplied to the air conditioning unit enables a reduction in the cooling air mass flow to be supplied to a preheat exchanger by the engines of the aircraft or a separate compressor and therefore direct reductions in fuel. Furthermore, an increase in the temperature of the process air mass flow supplied to the air conditioning unit necessarily also results in an increase in the temperature of the trim air diverted from the process air mass flow supplied to the air conditioning unit. An increase in the trim air temperature results in a reduction in the trim air mass flow requirement and therefore enables a further reduction in the quantity of process air to be provided by the engines of the aircraft or a separate compressor.

In a preferred embodiment of the control method according to the invention, with an increase in the temperature of the process air mass flow supplied to the air conditioning unit, the internal valve is closed to the extent that the increase in the temperature of the process air mass flow supplied to the air conditioning unit does not result in a change in the temperature of a process air mass flow exiting the air conditioning unit. This prevents an increase in the temperature of the process air mass flow supplied to the air conditioning unit from impairing the overall cooling capacity of the air conditioning unit, without reducing the increases in efficiency resulting from the increase in the temperature of the process air mass flow supplied to the air conditioning unit.

The temperature of the process air mass flow supplied to the air conditioning unit is preferably only increased so long as it can be ensured by closing the internal valve that the increase in the temperature of the process air mass flow supplied to the air conditioning unit does not result in a change in the temperature of a process air mass flow exiting the air conditioning unit. In this configuration of the control method according to the invention, it is ensured that the increase in the temperature of the process air mass flow supplied to the air conditioning unit is stopped as soon as a further increase in the temperature of the process air mass flow supplied to the air conditioning unit results in an impairment of the overall cooling capacity of the air conditioning unit or a drop in the increases in efficiency achieved by increasing the temperature of the process air mass flow supplied to the air conditioning unit.

An apparatus according to the invention for controlling an aircraft air conditioning system comprises a detection device which is adapted to detect an operating state of an air conditioning unit of the aircraft air conditioning system, and a control device which is adapted to control the temperature of a process air mass flow supplied to the air conditioning unit in dependence on the operating state of the air conditioning unit.

The detection device can be adapted to determine the operating state of at least one ram air channel flap for the purpose of determining the operating state of the air conditioning unit, said ram air channel flap in turn being adapted to control a flow cross-section of a ram air channel for the supply of ambient air to a heat exchanger unit of the air conditioning unit.

Furthermore, the detection device can be adapted to determine the operating state of at least one internal valve of the air conditioning unit for the purpose of determining the operating state of the air conditioning unit, said internal valve in turn being adapted to effect an increase in the temperature of a process air mass flow exiting the air conditioning unit in its open state.

The control device is preferably adapted to alter the temperature of the process air mass flow supplied to the air conditioning unit only if it is determined upon detecting the operating state of the air conditioning unit that the ram air channel flap only frees a minimum flow cross-section of the ram air channel and/or that the internal valve is open.

Furthermore, the control device can be adapted to increase the temperature of the process air mass flow supplied to the air conditioning unit if it is determined upon detecting the operating state of the air conditioning unit that the ram air channel flap only frees a minimum flow cross-section of the ram air channel and/or that the internal valve is open.

The control device is furthermore preferably adapted to steer the internal valve into its closed position upon an increase in the temperature of the process air mass flow supplied to the air conditioning unit to the extent that the increase in the temperature of the process air mass flow supplied to the air conditioning unit does not result in a change in the temperature of a process air mass flow exiting the air conditioning unit.

Finally, the control device can be adapted to increase the temperature of the process air mass flow supplied to the air conditioning unit only so long as it can be ensured by closing the internal valve that the increase in the temperature of the process air mass flow supplied to the air conditioning unit does not result in a change in the temperature of a process air mass flow exiting the air conditioning unit.

BRIEF DESCRIPTION OF DRAWINGS

A preferred embodiment of the invention is now explained in more detail, with reference to the accompanying schematic drawings, which show:

FIG. 3 further components of an aircraft air conditioning system equipped with an air conditioning unit according to FIG. 2.

DETAILED DESCRIPTION OF EMBODIMENTS

Figure 1:
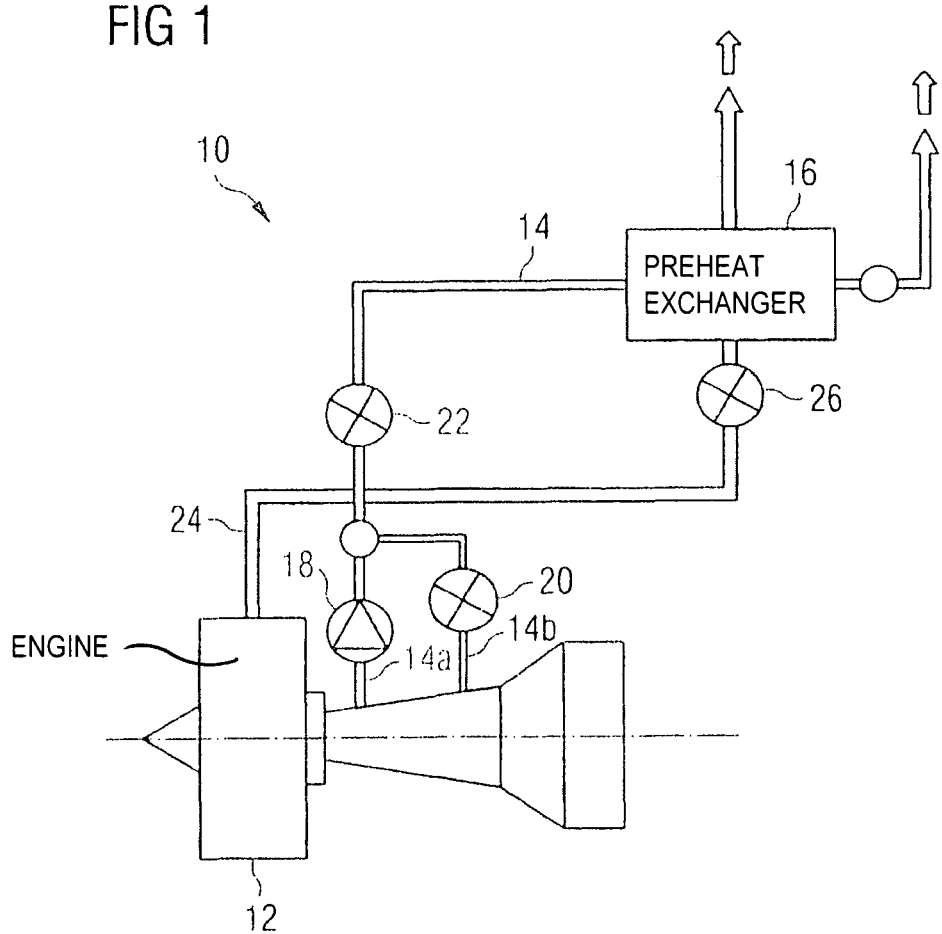
FIG. 1 an illustration of the construction and the functional principle of an engine bleed-air system.

FIG. 1 shows an engine bleed-air system 10 which serves to extract hot bleed air from an aircraft engine 12 for the purpose of supplying process air to an air conditioning unit of the aircraft air conditioning system. The engine bleed-air system 10 comprises an engine bleed-air line 14 in which a preheat exchanger 16 for cooling the engine bleed air flowing through the engine bleed-air line 14 is arranged. At its first end, the engine bleed-air line 14 has a first and a second engine bleed-air line branch 14a, 14b. The engine bleed-air line branches 14a, 14b are connected to the engine 12 of the aircraft at different positions. The hot engine bleed air extracted from the engine 12 therefore flows via the engine bleed-air line branches 14a 14b into the engine bleed-air line 14 and from there through the preheat exchanger 16.

The engine bleed air flowing through the engine bleed-air line branch 14b has a higher system pressure than the engine bleed air which is discharged from the engine 12 of the aircraft through the engine bleed-air line branch 14a. To prevent the more highly pressurised engine bleed air flowing back out of the engine bleed-air line branch 14b and into the engine 12 by way of the engine bleed-air line branch 14a, a non-return valve 18 is arranged in the engine bleed-air line branch 14a. The engine bleed-air flow through the engine bleed-air line branch 14b is, on the other hand, controlled by a first control valve 20. A second control valve 22, on the other hand, controls the bleed air flow through the engine bleed-air line 14 downstream of the engine bleed-air line branches 14a, 14b.

Cooling air—the so-called fan air—which is extracted from the engine 12 and supplied to the preheat exchanger 16 by way of a cooling air line 24 serves to cool the engine bleed air flowing through the preheat exchanger 16. The cooling air flow through the cooling air line 24 is controlled by means of a third control valve 26. After flowing through the preheat exchanger 16, the cooling air is discharged into the environment. The engine bleed air which is cooled as it flows through the preheat exchanger 16, on the other hand, is supplied as process air to an air conditioning unit 27 shown in FIG. 2 and to a wing de-icing system (not shown here) of the aircraft.

Figure 2:
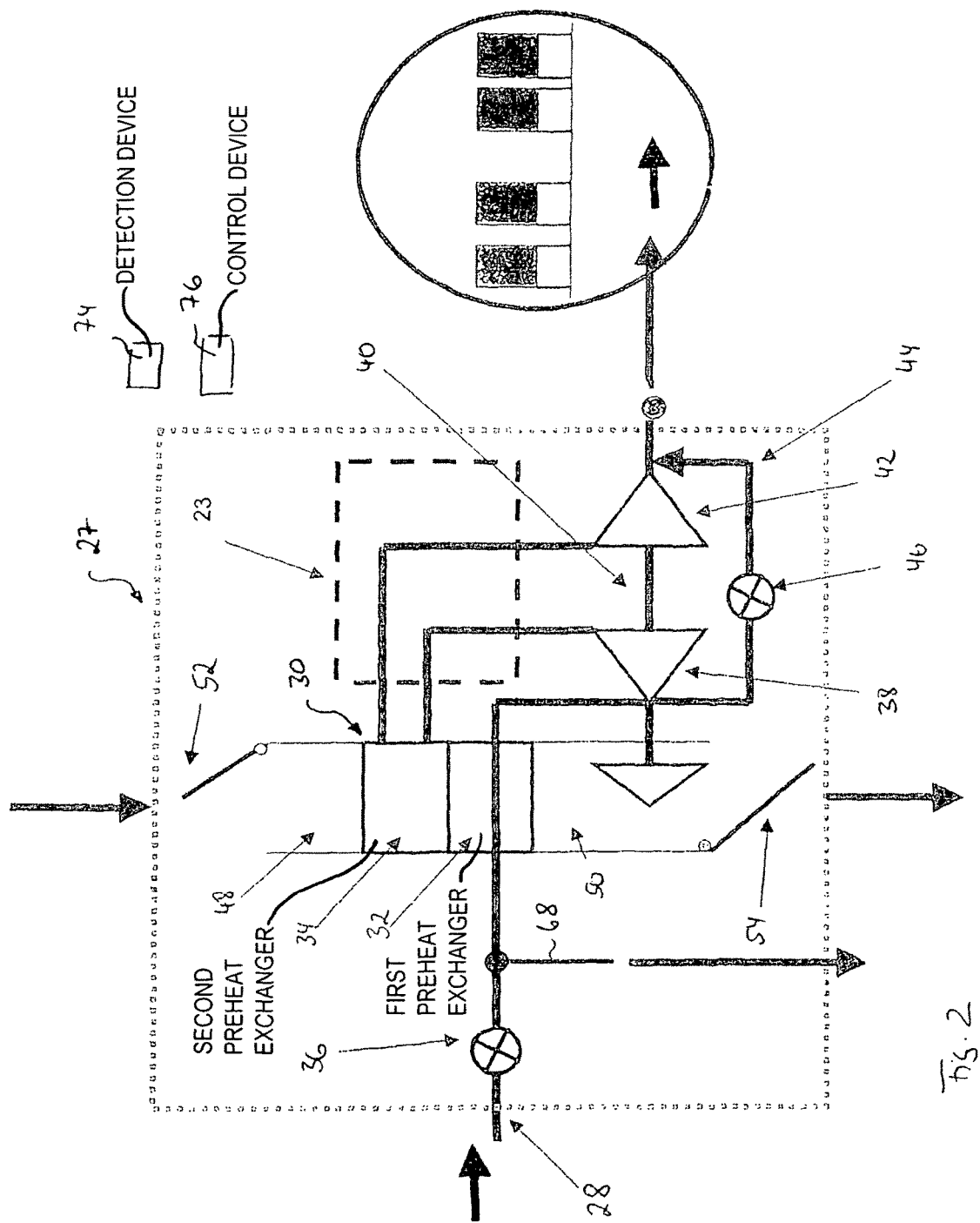
FIG. 2 an illustration of the construction and the functional principle of an air conditioning unit suitable for use in an aircraft air conditioning system.

In the air conditioning unit 27 shown in FIG. 2, hot process air, which is either provided in flight mode of the aircraft by an engine bleed-air system 10 shown in FIG. 1 or is generated by compressors constructed separately from the engines of the aircraft, is supplied to a heat exchanger unit 30 by way of a process air line 28. The control of the process air temperature at the inlet of the air conditioning unit 27 can be realised for example by a corresponding control of the engine bleed-air discharge from the engine 12 by way of the engine bleed-air line branches 14a, 14b and/or the control of the cooling capacity of the preheat exchanger 16.

In the example shown in FIG. 2, the heat exchanger unit 30 comprises a first heat exchanger 32 and a second heat exchanger 34. A fourth control valve 36 controls the process air flow through the process air line 28. During operation of the air conditioning unit 27, the process air flowing through the process air line 28 is firstly supplied to the first heat exchanger 32 for cooling. After flowing through the first heat exchanger 32, the process air is conducted into a compressor 38 of a compressor/turbine unit 40. The process air which is compressed by the compressor 38 and, at the same time, heated, is cooled again as it flows through the second heat exchanger 34 and finally undergoes expansion and further cooling in a turbine 42 of the compressor/turbine unit 40. Process air exiting the first heat exchanger 32 can be conducted past the compressor/turbine unit 40 by way of a bypass line 44. The process air flow through the bypass line 44 is controlled by means of a bypass valve 46. Opening the bypass valve 46 causes the warmer air flowing through the process air line 28 upstream of the compressor/turbine unit 40 to be added to a region of the process air line 28 which is located downstream of the compressor/turbine unit 40.

The hot process air supplied to the heat exchangers 32, 34 of the heat exchanger unit 30 is cooled by thermal energy transfer to the cold aircraft ambient air flowing through the heat exchanger unit 30. The aircraft ambient air is supplied to the heat exchanger unit 30 through a ram air inlet channel 48 having a low temperature and low pressure. After flowing through the heat exchanger unit 30, the ambient air heated by emitting its cooling energy to the hot process air leaves the aircraft through a ram air outlet channel 50. A control of the cooling capacity provided by the heat exchanger unit 30 of the air conditioning unit 27 can be effected by a corresponding control of the mass flow of the ambient air conducted through the heat exchanger unit as cooling air. This means that relatively large flow cross-sections of the ram air inlet channel 48 and/or the ram air outlet channel 50 have to be freed, which is realised by opening corresponding flaps 52, 54 controlling the flow cross-sections of the ram air inlet channel 48 and/or the ram air outlet channel 50. Furthermore, the temperature of the cooled process air exiting the air conditioning unit 27 can be controlled by a corresponding control of the compressor/turbine unit 40, the valve 46 and further internal valves (not shown in FIG. 2) of the air conditioning unit 27.

A maximum cooling capacity of the air conditioning unit 27, i.e. a minimum process air temperature at the outlet of the air conditioning unit 27, is achieved if the ram air channel flaps 52, 54 are maximally opened and the internal valves, in particular the bypass valve 46, are closed. On the other hand, a nominal cooling capacity of the air conditioning unit 27 is defined as a cooling capacity which is delivered by the air conditioning unit 27 when the ram air channel flaps 52, 54 are minimally opened and the internal valves, in particular the bypass valve 46, are closed. Since air conditioning units which are provided for use in aircraft air conditioning systems are conventionally designed for fault scenarios, their nominal cooling capacity generally exceeds the cooling capacity requirement prevailing in normal operation of the aircraft. It is therefore frequently necessary to open internal valves, in particular the bypass valve 46, during operation of an air conditioning unit 27, even if the ram air channel flaps 52, 54 are only minimally opened, in order to ensure that the process air leaves the air conditioning unit 27 at the desired temperature and not at too low a temperature.

The cooled process air exiting the air conditioning unit 27 is supplied to a mixing chamber 56 shown in FIG. 3. The mixing chamber 56 can be a central mixing chamber. However, the mixing chamber 56 can also be one of a plurality of mixing chambers of the aircraft air conditioning system. In the mixing chamber 56, the process air is mixed with recirculation air discharged from an aircraft region to be cooled, for example an aircraft cabin. From the mixing chamber 56, mixed air containing process air and recirculation air is conducted by way of corresponding mixed air lines 58a-58d into the aircraft region to be cooled, which comprises different air conditioning zones 60a-60d. In the example shown in FIG. 3, each air conditioning zone 60a-60d is equipped with a temperature sensor 62a-62d for detecting the actual temperature in the air conditioning zone 60a-60d. A temperature regulator 64, on the other hand, supplies a set-temperature value for each air conditioning zone 60a-60d.

In dependence on the actual temperatures in the air conditioning zones 60a-60d, which are measured by the temperature sensors 62a-62d, and in dependence on the set-temperature values for the air conditioning zones 60a-60d, which are provided by the temperature regulator 64, a control unit 66 controls the temperature of the mixed air leaving the mixing chamber 56 according to the lowest set temperature value for an air conditioning zone 60a-60d. This means that the air conditioning zone 60a-60d with the lowest set-temperature value can be supplied exclusively with mixed air from the mixing chamber 56, whilst the other air conditioning zones 60a-60d have to be supplied with air whereof the temperature undergoes a temperature increase downstream of the mixing chamber 56.

The air to be supplied to an air conditioning zone 60a-60d is conventionally heated downstream of the mixing chamber 56 by the supply of hot air, so-called trim air, into the corresponding mixed air line 58a-58d associated with the air conditioning zone 60a-60. To this end, a trim air line 68 is provided which branches off from the process air line 28 upstream of the heat exchanger unit 30 of the air conditioning unit 27 (see FIG. 2) and is connected to the individual mixed air lines 58a-58d by way of corresponding trim air line branches 70a-70d. Corresponding fifth control valves 72a-72d control the supply of trim air from the trim air line 68 into the mixed air lines 58a-58d. In the air conditioning unit 27 shown in FIG. 2, the trim air line 68 branches off from the process air line 28 upstream of the fourth valve 36. Alternatively, however, the trim air line 68 can also be connected to the process air line 28 downstream of the fourth valve 36.

The discharge of trim air from the process air line 28 causes a reduction in the process air mass flow to be cooled in the air conditioning unit 27, which has to be compensated by a corresponding drop in the temperature of the process air exiting the air conditioning unit 27 to enable a certain predetermined cooling capacity of the air conditioning unit 27 to be maintained. This drop in temperature can be realised by a corresponding increase in the cooling air mass flow through the heat exchanger unit 30 of the air conditioning unit 27, i.e. by opening the ram air channel flaps 52, 54. It goes without saying that the temperature of the process air exiting the air conditioning unit 27 has to be lower, the higher the trim air mass flow requirement during operation of the air conditioning unit.

By means of the system arrangement shown in FIG. 3, both heating and cooling of the air conditioning zones 60a-60d is possible. Furthermore, it is simultaneously possible to heat individual air conditioning zones 60a-60d and cool other air conditioning zones 60a-60d. To this end, it is merely necessary, as described above, to control the temperature of the mixed air leaving the mixing chamber 56 in dependence on the lowest set-temperature value for an air conditioning zone 60a-60d and to bring the temperature of the air to be supplied to the other air conditioning zones 60a-60d to the designed temperature level by adding trim air to the mixed air accordingly. It is generally the case that the quantity of trim air required for temperature control in the air conditioning zones 60a-60d is comparatively low so long as all air conditioning zones 60a-60d require the supply of mixed air of a similar temperature or the temperature of the mixed air supplied by the mixing chamber 56 is too low for only a small number of air conditioning zones 60a-60d and has to be increased by a corresponding trim air supply. If, on the other hand, an air conditioning zone 60a-60d or a low number of air conditioning zones 60a-60d has a relatively high cooling requirement and therefore requires the supply of cooler mixed air than the other air conditioning zones 60a-60d, the air to be supplied to the other air conditioning zones 60a-60d has to be brought to the required temperature level by the supply of correspondingly large quantities of trim air.

The control of the aircraft air conditioning system shown in FIGS. 1 to 3 is explained below. During operation of the aircraft air conditioning system, firstly the operating state of the air conditioning unit 27 is detected. In particular, the operating state of the ram air channel flaps 52, 54 is determined, i.e. the opening state of the ram air channel flaps 52, 54 is checked. To this end, correspondingly suitable sensors, for example sensors for measuring an opening angle of the ram air channel flaps 52, 54, can be provided. Furthermore, the operating state of the bypass valve 46 of the air conditioning unit 27 is determined, i.e. it is checked whether the bypass valve 46 is open or closed or, with a bypass valve 46 having a variable flow cross-section, the flow cross-section freed by the bypass valve 46 is measured. To this end, correspondingly suitable sensors (not shown in FIG. 2) can in turn be used. The signals of the sensors are transmitted to a detection device 74 for detecting the operating state of the air conditioning unit 27.

If the detection device 74, with reference to the sensor signals transmitted thereto, establishes that the ram air channel flaps 52, 54 only free a minimal flow cross-section of the ram air inlet channel 48 and the ram air outlet channel 50 and the bypass valve 46 is open and, in its open state, effects an increase in the temperature of the process air mass flow exiting the air conditioning unit 27, the detection device 74 recognises that the air conditioning unit 27 is only generating its nominal cooling capacity and not a cooling capacity exceeding the nominal cooling capacity. Furthermore, the detection device 74 recognises that the air conditioning unit 27, which is overdesigned for fault scenarios is operated in an operating state in which the ram air channel flaps 52, 54 are only minimally opened although the excess cooling capacity generated by the air conditioning unit 27 still needs to be discharged by way of the open bypass valve 46.

If these operating conditions prevail, a control device 76 controls the engine bleed-air discharge from the engine 12 and/or the cooling capacity of the preheat exchanger 16 in such a way that the process air temperature at the inlet of the air conditioning unit 27 increases. This is equivalent to an increase in the temperature of the trim air extracted from the process air line 28 at the inlet of the air conditioning unit 27. An increase in the process air temperature at the inlet of the air conditioning unit 27 enables a reduction in the cooling air mass flow guided through the preheat exchanger 16, i.e. the air mass flow to be extracted from the engine 12 and supplied to the preheat exchanger 16 can be reduced. Furthermore, by increasing the trim air temperature, the trim air requirement, and therefore the quantity of process air to be provided by the engine 12 of the aircraft, can be further reduced. The cooling capacity reserves of the air conditioning unit 27, which are held ready for fault scenarios, can therefore be used in optimum manner to increase the efficiency and reduce the fuel consumption of the aircraft.

If the control device 76 controls the engine bleed-air discharge from the engine 12 and/or the cooling capacity of the preheat exchanger 16 in such a way that the process air temperature at the inlet of the air conditioning unit 27 increases, the control device 76 further steers the open bypass valve 46 into its closed position to the extent that the increase in the temperature of the process air mass flow supplied to the air conditioning unit 27 does not result in a change in the temperature of a process air mass flow exiting the air conditioning unit 27. This prevents an increase in the temperature of the process air mass flow supplied to the air conditioning unit 27 from impairing the overall cooling capacity of the air conditioning unit 27 without reducing the gains in efficiency achieved by increasing the temperature of the process air mass flow supplied to the air conditioning unit 27.

Furthermore, the temperature of the process air mass flow supplied to the air conditioning unit 27 is increased under the control of the control device 76 only so long as it can be ensured by closing the bypass valve 46 that the increase in the temperature of the process air mass flow supplied to the air conditioning unit 27 does not result in a change in the temperature of a process air mass flow exiting the air conditioning unit 27. This means that the increase in the temperature of the process air mass flow supplied to the air conditioning unit 27 is stopped as soon as a further increase in the temperature of the process air mass flow supplied to the air conditioning unit 27 would result in an impairment of the overall cooling capacity of the air conditioning unit 27 or a reduction in the gains in efficiency achieved by increasing the temperature of the process air mass flow supplied to the air conditioning unit 27.

The invention claimed is:

1. A method for controlling an aircraft air conditioning system, the aircraft air conditioning system comprising an air conditioning unit with a heat exchanger and a compressor unit, the method comprising:
   flowing through both of the heat exchanger and the compressor unit of the air conditioning unit a process air mass flow supplied to the air conditioning unit,
   detecting an operating state of the air conditioning unit of the aircraft air conditioning system, and
   controlling the temperature of the process air mass flow supplied to the air conditioning unit in dependence on the detecting of the operating state of the air conditioning unit prior to the air mass flowing into the compressor unit,
   wherein detecting the operating state of the air conditioning unit comprises determining the operating state of at least one internal bypass valve of the air conditioning unit, the valve, in its open state, effecting an increase in the temperature of a process air mass flow exiting the air conditioning unit.

2. A method according to claim 1,
wherein detecting the operating state of the air conditioning unit comprises determining the operating state of at least one ram air channel, which controls a flow cross-section of a ram air channel for the supply of ambient air to the heat exchanger unit of the air conditioning unit.

3. A method according to claim 2,
wherein the temperature of the process air mass flow supplied to the air conditioning unit is altered only in the event that it is determined upon detecting the operating state of the air conditioning unit that the ram air channel flap only frees a minimal flow cross-section of the ram air channel and/or that the internal valve is open.

4. A method according claim 2,
wherein the temperature of the process air mass flow supplied to the air conditioning unit is increased in the event that it is determined upon detecting the operating state of the air conditioning unit that the ram air channel flap only frees a minimal flow cross-section of the ram air channel and/or that the internal valve is open.

5. A method according to claim 4,
wherein, with an increase in the temperature of the process air mass flow supplied to the air conditioning unit, the internal valve is closed to the extent that the increase in the temperature of the process air mass flow supplied to the air conditioning unit does not result in a change in the temperature of a process air mass flow exiting the air conditioning unit.

6. A method according to claim 4,
wherein the temperature of the process air mass flow supplied to the air conditioning unit is only increased provided that it can be ensured by closing the internal valve that the increase in the temperature of the process air mass flow supplied to the air conditioning unit does not result in a change in the temperature of a process air mass flow exiting the air conditioning unit.

7. An apparatus for controlling an aircraft air conditioning system, the air conditioning system comprising an air conditioning unit with a heat exchanger and a compressor unit, the apparatus comprising:
a process air mass flow supplier that supplies a process air mass flow to the air conditioning unit to cause both of the heat exchanger and the compressor unit of the air conditioning unit to be flown through by the process air mass flow,
a detection device, which is configured to detect an operating state of the air conditioning unit of the aircraft air conditioning system, and
a control device which is configured to control the temperature of the process air mass flow supplied to the air conditioning unit in dependence on the detecting of the operating state of the air conditioning unit prior to the air mass flowing into the compressor unit,
wherein the detection device is configured to determine the operating state of at least one internal bypass valve of the air conditioning unit, for the purpose of determining the operating state of the air conditioning unit, which is in turn configured to effect an increase in the temperature of a process air mass flow exiting the air conditioning unit in its open state.

8. An apparatus according to claim 7,
wherein the detection device is configured to determine the operating state of at least one ram air channel flap for the purpose of determining the operating state of the air conditioning unit, said ram air channel flap in turn being configured to control a flow cross-section of a ram air channel for the supply of ambient air to the heat exchanger unit of the air conditioning unit.

9. An apparatus according to claim 7,
wherein the control device is configured to alter the temperature of the process air mass flow supplied to the air conditioning unit only in the event that it is determined upon detecting the operating state of the air conditioning unit that the ram air channel flap only frees a minimum flow cross-section of the ram air channel and/or that the internal valve is open.

10. An apparatus according to claim 7,
wherein the control device is configured to increase the temperature of the process air mass flow supplied to the air conditioning unit in the event that it is determined upon detecting the operating state of the air conditioning unit that the ram air channel flap only frees a minimal flow cross-section of the ram air channel and/or that the internal valve is open.

11. An apparatus according to claim 10,
wherein the control device is configured to steer the internal valve into its closed position upon an increase in the temperature of the process air mass flow supplied to the air conditioning unit to the extent that the increase in the temperature of the process air mass flow supplied to the air conditioning unit does not result in a change in the temperature of a process air mass flow exiting the air conditioning unit.

12. An apparatus according to claim 10,
wherein the control device is configured to increase the temperature of the process air mass flow supplied to the air conditioning unit only provided it can be ensured by closing the internal valve that the increase in the temperature of the process air mass flow supplied to the air conditioning unit does not result in a change in the temperature of a process air mass flow exiting the air conditioning unit.

\* \* \* \* \*